United States Patent [19]

Brentrup et al.

[11] Patent Number: 5,203,892
[45] Date of Patent: Apr. 20, 1993

[54] COKE FILTER

[75] Inventors: Ludger Brentrup, Oelde; Heinz-Herbert Schmits, Rheda-Wiedenbruck, both of Fed. Rep. of Germany

[73] Assignee: Krupp Polysius AG, Fed. Rep. of Germany

[21] Appl. No.: 916,274

[22] Filed: Jul. 21, 1992

[30] Foreign Application Priority Data

Aug. 20, 1991 [DE] Fed. Rep. of Germany ... 9110285[U]

[51] Int. Cl.$^5$ ............................................. B01D 19/00
[52] U.S. Cl. ....................................... 55/274; 55/479
[58] Field of Search ................... 55/20, 274, 163, 479

[56] References Cited

U.S. PATENT DOCUMENTS

| | | | |
|---|---|---|---|
| 4,149,858 | 4/1979 | Naadk et al. | 55/479 |
| 4,333,751 | 6/1982 | Iwamura et al. | 55/479 |

FOREIGN PATENT DOCUMENTS 61-53555  3/1986  Japan ...................................... 55/20

*Primary Examiner*—Bernard Nozick
*Attorney, Agent, or Firm*—Learman & McCulloch

[57] ABSTRACT

The invention relates to a coke filter for cleansing a gas stream, containing a temperature measuring arrangement having a photoconductor which is supplied with pulsed laser light and is passed in a loop through the filter chamber near the outlet openings. In such a coke filter the temperatures prevailing at all critical points are determined in a simple and reliable manner.

11 Claims, 3 Drawing Sheets

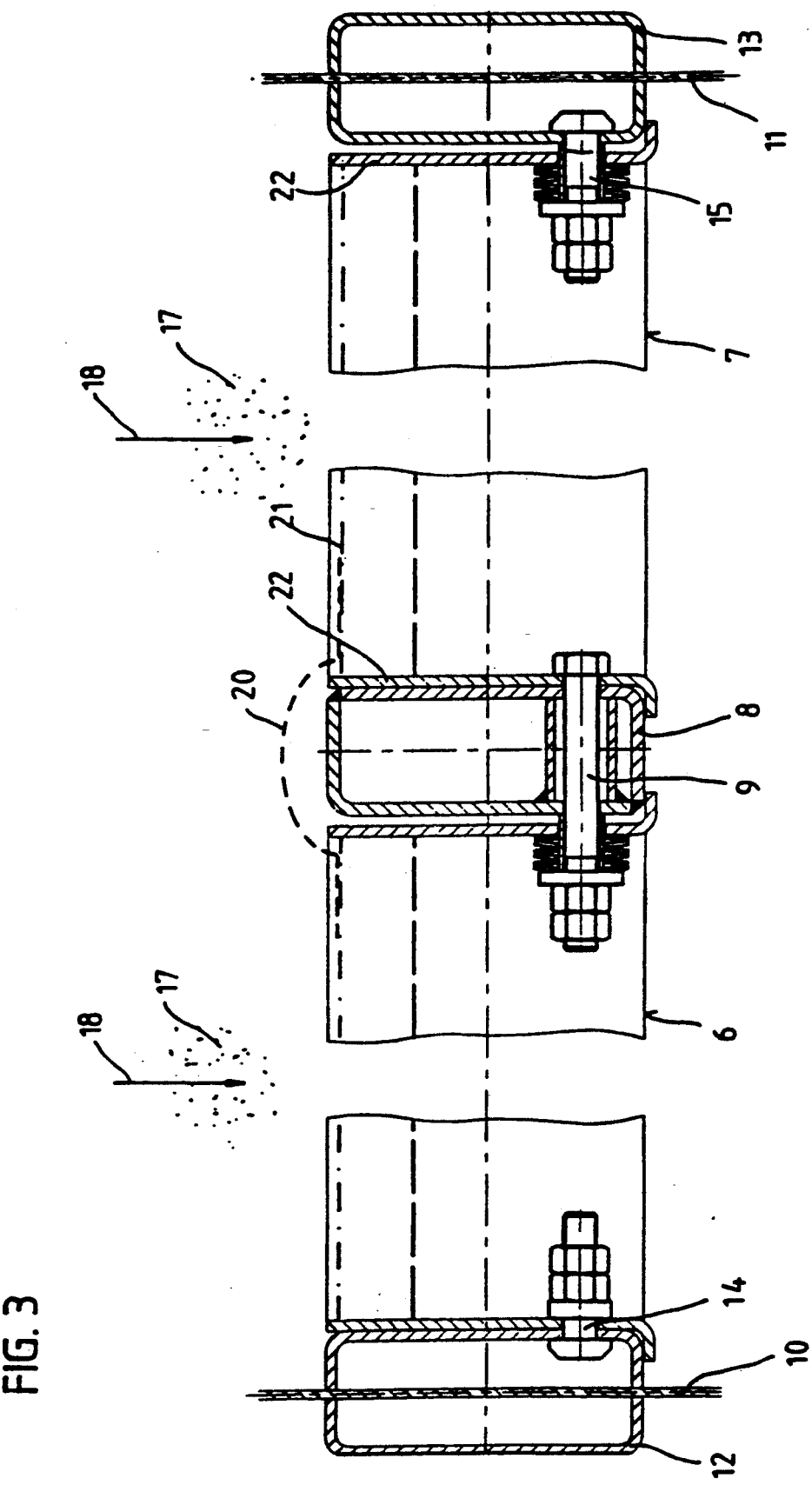

COKE FILTER

Known coke filters for the cleansing of gas streams contain at least two granular beds of carbonised lignite through which the gas stream to be cleansed passes. Filters of this kind can have quite considerable dimensions, which in view of the frequently high temperature of the gas stream to be cleansed brings with it the danger of spontaneous ignition of the coke or the formation of pockets of smouldering material.

In order to be able to recognise such dangers at an early stage it is known for coke filters to be provided with temperature measuring and monitoring arrangements.

Temperature measuring arrangements in the form of heat sensors which measure at selected points in order to determine the temperatures prevailing at predetermined locations in the filter chamber. However, the expenditure on maintenance which is necessary for this is considerable, above all because of the considerable wear to which heat sensors arranged in or near the granular mass of coke are subjected.

So-called delta-CO measurement has also been used for monitoring coke filters. In this case the CO formed by the oxidation of the coke is measured by means of a differential measurement between the filter inlet and the filter outlet. With a raised temperature the specific CO formation rate increases markedly and thus facilitates relatively early detection. However, the integral signal obtained with this measurement does not permit in a simple and practical construction any localised co-ordination with the CO production and thus with any smouldering which may be developing. For such localised detection, multiple sampling would be necessary, for instance using a system of "sniffing lines".

Furthermore, since in many cases (for instance in the cleansing of exit gases from rotary kilns for the production of cement) there is a relatively high and, moreover, in the combustion of low-grade fuels (such as automobile tires) fluctuating basic level of CO, relatively long averaging times for the delta-CO signal are necessary in order to be able to locate the disruption more accurately and to take specific countermeasures.

According to the invention a photoconductor supplied with pulsed laser light is used as the temperature measuring arrangement for the coke filter. If pulsed laser light is radiated into such a photoconductor from both ends and the light which is scattered back due to the so-called Raman effect is measured, then the duration provides information on the location and the intensity provides information on the temperature along the photoconductor. In this case the so-called "anti-Stokes" lines are used, which show a strong dependence on temperature.

According to the invention this photoconductor is arranged near the outlet openings which are provided in one wall of the filter chamber and is threaded through the filter chamber in a loop. In this case the invention exploits the knowledge that the heat of a smouldering fire in a coke filter is transported with the gas stream to the chamber wall containing the outlet openings, in which case this horizontal diffusion (in the case of vertically arranged chamber walls) is overlaid by a vertical component as a result of the uplift of the warm gases in the coke layer. However, in the tests on which the invention is based it has proved sufficient to measure the temperature of the gas stream on the outlet side since this gives sufficient accuracy to be able to instigate countermeasures in good time.

The photoconductor is advantageously arranged in the granular mass of coke. If the chamber wall provided with outlet openings is constructed as a louvre wall, then the photoconductor is advantageously provided in the spaces in the louvre wall which form the outlet openings. At this point the photoconductor reliably determines the temperature of the gas flowing out of the coke filter and at the same time is largely protected from damage and wear because the coke mass is only moving very slowly.

Since the photoconductor is passed in a loop through the filter chamber and supplies the temperature distribution over the length of the photoconductor as information, a reliable statement can be derived from this information regarding the exact location of any smouldering fire.

If the coke filter consists of several filter chambers, then it is advantageous for each filter chamber to be provided with its own measuring circuit, in which case the individual measuring circuits are questioned in succession.

Approximately 10 s are necessary per measuring circuit for this. Thus if four measuring circuits are used a new temperature distribution over the entire coke filter is available after approximately 40 s. The data obtained are processed with the aid of a suitable program, displayed and linked to alarm signals. The display enables the operating staff to take specific countermeasures, for instance to move or draw off the coke mass.

If the photoconductor is arranged in the granular mass of coke, then the temperatures prevailing at the individual points in the coke mass are reliably measured and no falsifications occur due to gas being drawn upwards from lower-lying zones. The arrangement of the photoconductor in the coke mass also permits a particularly sensitive temperature measurement. In the tests on which the invention is based it was shown that temperature measurement in the gas space on the outlet side leads to markedly lower measurement values.

As the photoconductor is provided near the outlet openings, the entire cross-section of the filter surface can be monitored by the heat transport taking place with the gas flow.

The photoconductor of the arrangement according to the invention can be installed very simply. The entire length of the photoconductor (for example approximately 1000 m per wall of a filter chamber) can be brought into the interior of the filter chamber immediately before the introduction of the granular mass of coke and can be unwound from a roll there. Thus it is not necessary to thread the entire length through a large number of holes.

The louvre elements of the louvre wall can be replaced without complete removal of the photoconductor (which would be associated with a risk of breakdown). For this purpose it is merely necessary to release the clamp fastening of the photoconductor onto the photoconductor supports of the louvre elements to be replaced.

One embodiment of the invention is illustrated in the drawings, in which:

FIG. 3 shows a horizontal section through two adjacent louvre elements.

Figure 1:
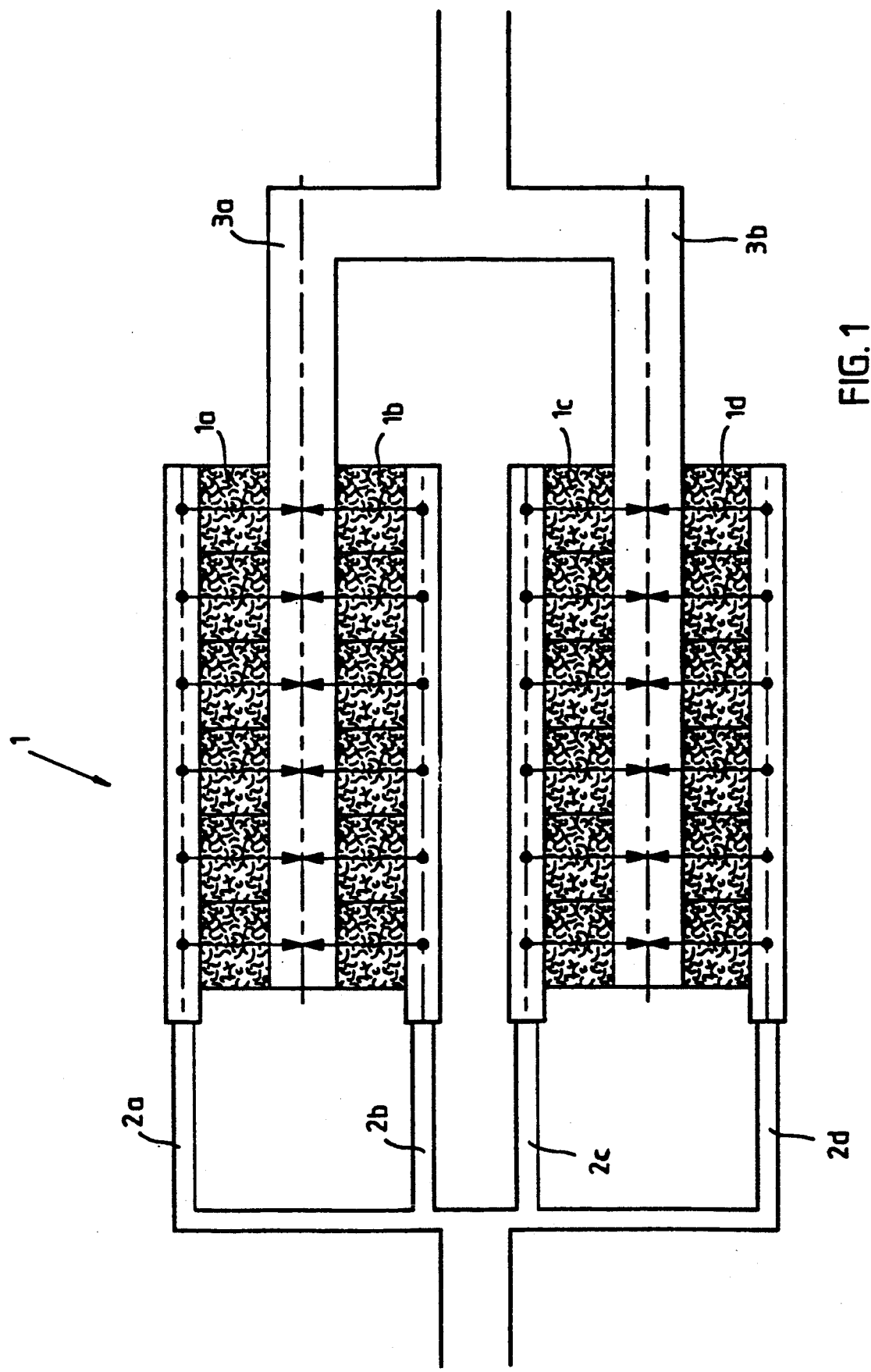
FIG. 1 shows a schematic plan view of a coke filter according to the invention.

The coke filter 1 which is shown quite schematically in FIG. 1 consists of four filter chambers 1a, 1b, 1c and 1d which are arranged adjacent to one another. The gas stream to be cleansed is delivered to the filter chambers by means of inlet ducts 2a, 2b, 2c, 2d. After the gas stream has passed through the coke filter 1 it is extracted via outlet ducts 3a, 3b.

The filter chambers 1a, 1b, 1c, 1d are defined by vertically arranged chamber walls in which inlet openings are provided on one side and outlet openings on the other side for the gas stream to be cleansed.

Figure 2:
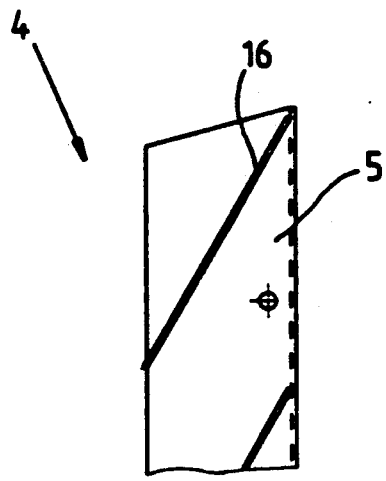
FIG. 2 shows a vertical partial section through the louvre wall provided with the outlet openings.
Figure 2:
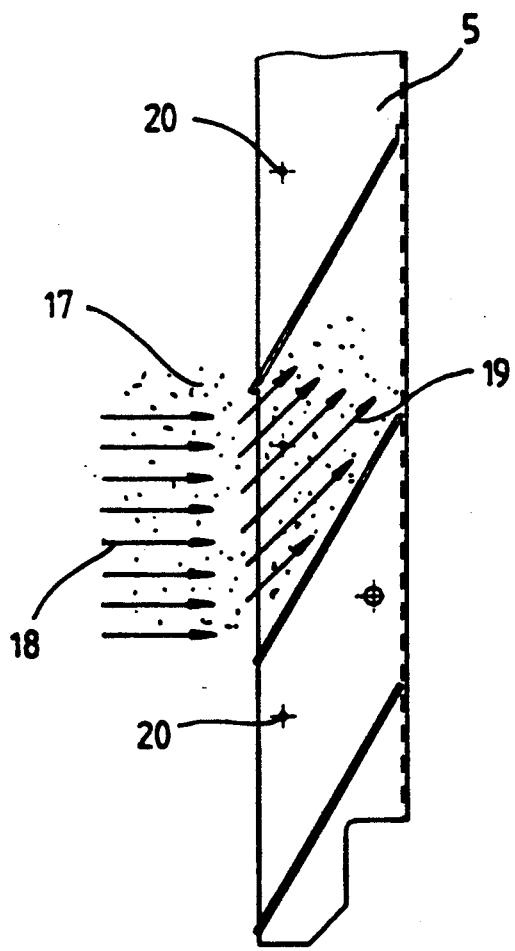

FIG. 2 shows, in a vertical partial section, a chamber wall 4 which is provided with outlet openings 5 for the gas stream.

The chamber wall 4 is constructed as a louvre wall and consists—as can be seen in particular from FIG. 3—of individual louvre elements (e.g. 6, 7) which are arranged adjacent to and above one another and are connected by means of screw bolts 9 to a girder section 8 arranged between these adjacent louvre elements 6, 7. On the two long sides the filter chamber is closed off by chamber walls 10, 11 which are connected by means of girder sections 12, 13 and screw bolts 14, 15 to the neighbouring louvre elements 6, 7.

The louvre elements 6, 7 contain inclined louvres 16 which define the outlet openings 5.

The granular mass of coke 17 arranged in the filter chamber extends to some extent—as can be seen in FIG. 2—into the space defined by louvres 16 which lie above one another.

The gas stream to be cleansed flows off through the outlet openings 5 and passes in a horizontal direction (arrows 18) through the granular mass of coke 17.

A temperature measuring arrangement which contains a photoconductor 20 supplied with pulsed laser light serves to determine the temperatures prevailing in the filter chamber. This photoconductor is arranged near to or in the outlet openings 5 of the chamber wall 4 in the granular mass of coke 17 and passes in a loop through the filter chamber.

For this purpose bar-shaped photoconductor carriers 21 (shown schematically in FIG. 3) which serve for releasable mounting of the photoconductor 20 are provided in the spaces in the louvre wall 4 which form the outlet openings 5. These photoconductor carriers 21 are fixed on crosspieces 22 of the louvre elements 6, 7 which define the outlet openings 5 laterally.

The photoconductor 21 is advantageously laid in fine steel tubes of small diameter (approximately 1 mm). At the junctions between adjacent louvre elements 6, 7, i.e. in the zone of the girder section 8 which connects these louvre elements 6, 7 to one another, the photoconductor 20 is preferably laid loosely in the coke mass 17 (cf. FIG. 3).

In this way the photoconductor 20 is first of all passed horizontally through all the outlet openings 5 lying at the same height in all adjacent louvre elements of one chamber wall before it is then passed through the outlet openings which are adjacent in the vertical direction (next higher or next lower).

In the installation of the coke filter first of all the filter chamber is completely assembled. Before the granular mass of coke is introduced the photoconductor is installed. For this purpose the photoconductor can be brought into the interior of the filter chamber in a roll and then attached to the photoconductor carriers 21 by means of a simple clamp fastening, which can be achieved effortlessly from the outside of the louvre wall (by reaching through the outlet openings 5).

If after a certain period of operation it proves necessary to replace individual louvre elements 6, 7, this can be achieved without complete removal of the photoconductor 20 in a simple manner by releasing the clamp connection between the photoconductor 20 and the photoconductor carrier 21 in the region of the louvre element 6, 7 to be removed, after which the relevant louvre element can be removed without difficulty from the neighbouring girder section 8.

The photoconductor carriers 21 can be formed for example from fastening iron of approximately 6 mm diameter.

We claim:

1. Coke filter for cleansing a gas stream, comprising
   a) a filter housing with at least one filter chamber (1a, 1b, 1c, 1d) which serves to receive a granular mass of coke (17) and is defined by chamber walls in which inlet openings and outlet openings (5) are provided for the gas stream to be cleansed,
   b) and a temperature measuring arrangement for determining the temperatures prevailing at predetermined locations in the filter chamber,
characterised in that
   c) the temperature measuring arrangement contains a photoconductor (20) which is supplied with pulsed laser light and is passed in a loop through the filter chamber near the outlet openings (5).

2. Coke filter as claimed in claim 1, characterised in that the photoconductor (20) is arranged in the coke mass (17).

3. Coke filter as claimed in claim 1, characterised in that the photoconductor (20) is connected with both its ends to an arrangement for supplying pulsed laser light.

4. Coke filter as claimed in claim 1, characterised in that the photoconductor (20) is laid in fine steel tubes of small diameter.

5. Coke filter as claimed in claim 1, characterised in that the chamber wall (4) provided with the outlet openings (5) is constructed as a louvre wall and the photoconductor (20) is arranged in the spaces in the louvre wall which form the outlet openings (5).

6. Coke filter as claimed in claim 5, characterised in that photoconductor carriers (21) which are preferably bar-shaped and serve for releasable mounting of the photoconductor (20) are provided in the spaces in the louvre wall which form the outlet openings (5).

7. Coke filter as claimed in claim 6, characterised in that after the filter chamber has been assembled and before the granular mass of coke (17) is introduced the photoconductor (20) is connected to the photoconductor carriers (21) from the outside of the louvre wall, preferably by means of clamp connection elements.

8. Coke filter as claimed in claim 6, characterised in that the louvre wall consists of individual louvre elements (6, 7) which are arranged adjacent to and above one another, adjacent louvre elements being connected to a girder section (8) arranged between these louvre elements.

9. Coke filter as claimed in claim 8, characterised in that the photoconductor (20) is arranged freely in the granular mass of coke in the region of a girder profile (8) which connects two neighbouring louvre elements (6, 7) to one another.

10. Coke filter as claimed in claims 8, characterised in that the photoconductor carriers (21) are fixed onto the crosspieces (22) of the louvre elements (6, 7) which laterally define the outlet openings (5).

11. Coke filter as claimed in claim 10, characterised in that after releasing the connection between the photoconductor (20) and the photoconductor carrier (21) appertaining to one louvre element (6, 7) this louvre element can be released from the neighbouring girder sections (8) and can be replaced without complete removal of the photoconductor.

* * * * *